United States Patent [19]

Kruncos

[11] Patent Number: 4,475,407
[45] Date of Patent: Oct. 9, 1984

[54] TEMPERATURE COMPENSATED FLOW SENSOR

[75] Inventor: Francis E. Kruncos, Fond du Lac, Wis.

[73] Assignee: Brunswick Corporation, Skokie, Ill.

[21] Appl. No.: 453,449

[22] Filed: Dec. 27, 1982

[51] Int. Cl.³ ............................................. G01F 1/24
[52] U.S. Cl. .............................. 73/861.53; 73/861.01; 340/606
[58] Field of Search .................. 340/606, 607, 611; 137/468; 73/861.53, 861.01; 200/81.9 M, 82 E; 374/135; 116/216

[56] References Cited

U.S. PATENT DOCUMENTS

| | | | |
|---|---|---|---|
| 2,372,166 | 3/1945 | McCarty | 73/861.54 |
| 3,510,816 | 5/1970 | Bagg | 200/81.9 M |
| 3,910,112 | 10/1975 | Gerlach | 73/861.53 |
| 4,166,936 | 9/1979 | Tice | 340/611 |
| 4,181,835 | 1/1980 | Stadler et al. | 340/611 |
| 4,213,021 | 7/1980 | Alexander | 200/81.9 M |
| 4,336,903 | 6/1982 | Zirps | 137/468 |

Primary Examiner—Gerald Goldberg
Assistant Examiner—Hezron Williams
Attorney, Agent, or Firm—O. T. Sessions

[57] ABSTRACT

A temperature compensated flow sensor (10) for monitoring oil flow to a two-cycle engine includes a magnetic flow sensing body (26) mounted in a flow sensing bore (21). The position of the flow sensing body is detected by a Hall switch (42) to provide an electrical output indicating a flow or a no flow condition. The flow sensing body (26) is biased toward the Hall switch (42) by a spring (27) and a spring follower (31) controls the spring rate as a function of temperature. A thermal power element (35) moves the spring follower as a function of temperature to compensate for the change of oil viscosity with temperature.

9 Claims, 2 Drawing Figures

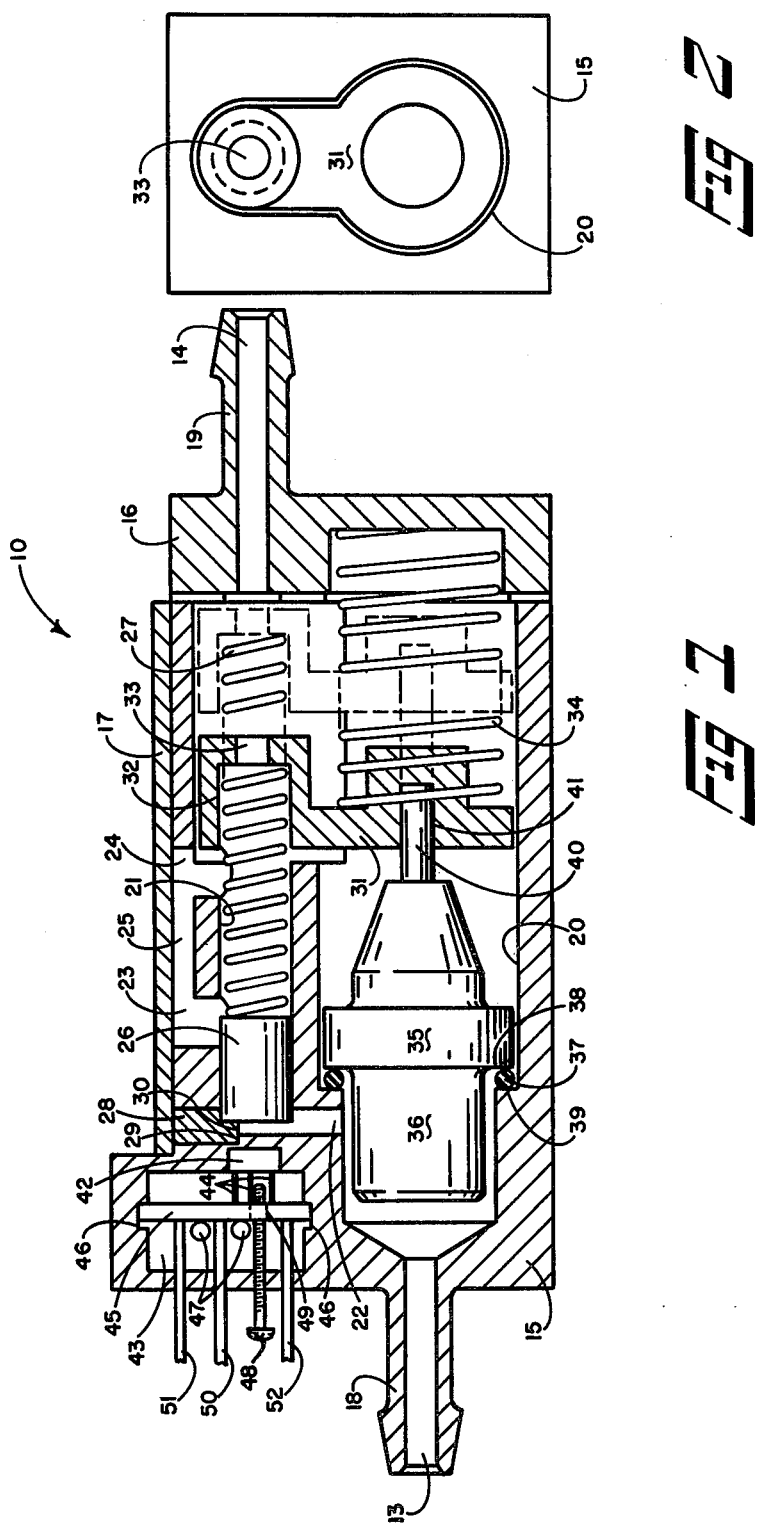

TEMPERATURE COMPENSATED FLOW SENSOR

DESCRIPTION

1. Technical Field

This invention relates to fluid flow sensors and particularly to such sensors for providing an electrical output indicating a no flow condition and the presence of a minimum flow rate.

2. Background Art

In two-cycle engines which supply lubricant to mix with fuel and provide lubrication for the engine, it is essential that the engine not be run if the lubricant supply is interrupted since damage to the engine would occur. Because even in a high performance engine for an outboard motor such as one developing 200 horsepower the required lubricant flow rate at idle may be quite low, i.e., less than one cc per minute, a flow sensor to detect the presence of flow must be very sensitive. Further, the flow sensor must be capable of functioning when small amounts of contaminants such as lint or dust are present in the oil.

DISCLOSURE OF INVENTION

In accordance with the present invention a flow sensor for detecting flow of a relatively viscous fluid such as oil is provided. The flow sensor acts to provide an electrical signal indicative of the flow of the viscous fluid. The flow sensor includes a sensor housing having a cylindrical bore with a fluid inlet in communication with a first end of the bore, a port in the cylindrical wall of the bore, and a fluid outlet in communication with the port. A cylindrical flow sensing body is mounted in the bore and is biased by a spring toward the first end of the bore to normally block flow from the inlet to the outlet. A position sensing device is mounted in the sensor housing to detect the position of the flow sensing body and produce a signal indicative of the flow of fluid through the sensor.

To prevent false signals the flow sensing body has a smaller cross-sectional area than does the bore in which it is mounted. Thus a relatively non-viscous fluid such as air may flow past the flow sensing body without displacing it, preventing a false indication of viscous fluid flow should air be pumped through the sensor.

Preferably the flow sensor includes a compensating means to reduce the biasing force provided by the spring as the temperature of the fluid passing through the sensor increases. The compensating means may include a follower, with the spring mounted between the follower and the flow sensing body. A temperature sensing device exposed to the fluid has a mechanical output element connected to the follower to move the follower away from the sensing body as the temperature of the fluid increases, thereby reducing the biasing force on the flow sensing body as the temperature increases.

Preferably the flow sensing body is magnetically polarized along its axis and the position sensing device includes a Hall-effect switch mounted in the sensor housing adjacent the first end of the bore to produce the electrical output indicating the position of the flow sensing body.

BRIEF DESCRIPTION OF THE DRAWINGS

FIG. 1 is a sectional view of a flow sensor according to the invention.

FIG. 2 is an end view of the sensor or FIG. 1 with the end cover removed.

BEST MODE FOR CARRYING OUT THE INVENTION

The drawings show a flow sensor 10 according to the invention for connection in circuit with a battery and a warning horn. The sensor 10 is intended for use in the lubricant supply line of a two-cycle engine to provide a warning signal should the lubricant supply be interrupted. The sensor 10 is intended to have its inlet 13 connected to receive lubricant from a pump, not illustrated, and to have its outlet 14 connected to supply lubricant to the engine.

The sensor housing is formed from a non-magnetic material such as aluminum or plastic and includes a main body 15 and two cover plates 16 and 17. An inlet fitting 18 is formed at one end of the main body 15 and an outlet fitting 19 is provided on the end cover plate 16. A temperature sensor bore 20 is provided coaxially with the inlet passage 13 while a flow sensing bore 21 is provided coaxially with the outlet passage 14. The flow sensing bore 21 is enlarged at the outlet end of the main body 15 to intersect the temperature sensor bore 20. At the inlet end of the flow sensing bore 21 a cross passage 22 is provided intersecting the end of the flow sensing bore 21 and the temperature sensor bore 20. Two axially spaced ports 23 and 24 formed in the side of the flow sensor bore are connected by a passage 25. The top cover 17 closes the end of the cross passage 22 and the passage 25.

Mounted in the flow sensing passage 21 is a cylindrical magnetic flow sensing body 26 polarized along its axis with its south pole at the inlet end. A coil spring 27, preferably formed of a non-magnetic material such as beryllium copper or a non-magnetic stainless steel, is placed in the flow sensing bore 21 to provide a force biasing the flow sensing body 26 toward the inlet end of the bore 21. The flow sensing body 26 is thus biased to occupy a position between the inlet 13 and the port 23, thereby normally blocking flow from the inlet 13 to the outlet 14. A stop member 28 is positioned in the cross bore 22 to assure that fluid pressure will act against the end of the sensor body 26. The stop member 28 is held in place between the top cover 17 and a shoulder 29 in the cross bore 22 and the sensor body 26 engages the reduced section 30 at the end of the stop member 28.

A spring follower 31 is provided in the outlet end of the flow sensing and temperature sensor bores 21 and 20. Again, the spring follower 31 is formed of a non-magnetic material such as aluminum or plastic. The spring follower 31 has a cylindrical portion 32 for guiding the end of the coil spring 27 and a hole 33 aligned with the outlet opening 14 to allow the passage of oil. Another, larger, follower spring 34 is provided to force the spring follower 31 toward the inlet end of the sensor housing 15. A thermally actuated power element 35 is mounted in the temperature sensor bore 20. Such power elements are commercially available from the Controls Division of Eaton Corporation and can be selected to provide an essentially linear piston displacement over a selected temperature range. The power element 35 is mounted with its temperature sensing element 36 in the inlet end of the temperature sensor bore 20 to assure fluid flow past the sensing element 36. An O-ring 37 is provided to seal between the flange 38 of the power element 35 and the step 39 in the temperature sensor bore 20 to normally prevent flow through the temperature sensor bore 20. The power element piston 40 engages a hole 41 in the spring follower 31 to drive the follower 31. The large follower spring 34, which is coaxial with the piston 40, holds the follower 31 against the piston 40 and provides enough force to normally hold the power element flange 38 against the O-ring 37 and step 39 in the bore 20, thereby holding the power element 35 in place.

A Hall-effect switch 42 is mounted in a cavity 43 adjacent the end of the flow sensing bore 21 to detect the position of the magnetic flow sensor 26. The Hall-effect switch 42 is formed on a semiconductor chip, commercially available from the Sprague Electric Company, and is supported in a recess in the cavity 43. The three leads 44 from the Hall cell 42 are attached to a printed circuit board 45 mounted in two slots 46 in the cavity 43. A first lead from the Hall cell 42 is connected to the positive terminal of a power supply such as a battery, a second lead is connected to ground, while a third lead provides an output which is used to activate a warning device such as a horn. Two capacitors 47, mounted on the circuit board, are connected between the ground lead 50 and the output lead 51 and between the ground lead 50 and the battery lead 52 to provide a filter network protecting from extraneous electrical noise. An adjacent screw 48 extends through the outer wall of the cavity 43 and through a hole 49 in the circuit board 45 and acts as a magnetic flux concentrator. The screw 48 is coaxially aligned with the flow sensing bore 21 and can have its position adjusted to calibrate the device.

OPERATION

To operate the flow sensor 10 of the invention the sensor is first calibrated by removing the stop member 28 and inserting a calibration member having a greater thickness to hold the flow sensing body 26 at a desired distance from the end of the bore 21. The position of the flux concentrating screw 48 is then adjusted to assure switching at that position. The stop member 28 is then reinserted and the sensor 10 is ready for operation.

In operation oil flowing through the inlet 13 will force the flow sensing body 26 away from the end of the bore 21 and provide an output inactivating the warning horn when the sensing body 26 has moved at least the calibrated distance from the end of the bore 21. Normally the oil will force the sensing body 26 against the spring 27 a sufficient distance to open the port 23 and allow flow through the passage 25 and out the outlet 14 to the engine, though extremely low flows will pass through the clearance between the sensor body 26 and the sensing bore 21.

In the preferred embodiment the flow sensing bore 21 has a nominal diameter of 0.252 inches while the sensing body 26 has a nominal diameter of 0.248 inches. A tolerance of ±0.001 inch on each of the forgoing dimensions allows adequate clearance for the purpose of the invention. Should air be pumped through the system the relatively low viscosity of the air allows it to pass through the clearance between the sensing body 26 and the sensing bore 21 without significantly displacing the sensor body 26. The clearance thus assures that a warning signal will be given should air be pumped through the system.

Since the viscosity of the oil flowing through the system decreases as the temperature increases, the oil will provide less frictional force against the flow sensing body 26. This is compensated for by the power element 35 which extends its piston 40 as temperature increases. As the piston 40 extends it will push back the follower element 31 and reduce the force applied by the spring 27 against the sensing body 26, thus compensating for the reduced viscosity of the oil and assuring essentially uniform response of the sensor, regardless of the temperature.

The clearance between the sensing bore 21 and the sensing body 26 further serves to reduce the sensitivity of the sensor to contaminants in the system such as small particles of dirt, dust, lint, etc., since these will normally not block the full circumference of the bore 21 and will tend to be removed as the sensing body 26 moves in the bore 21. In the unlikely event that the sensing body should become jammed in the bore 21 between the inlet 13 and the port 23, a pressure build up in the inlet 13 would force the power element 35 back against the follower spring 34 and open a passage through the temperature sensor bore 20 to allow oil to flow to the engine.

I claim:

1. A flow sensor for detecting flow of a relatively viscous fluid and producing an electrical signal indicative of the flow of said viscous fluid, said flow sensor comprising:
   (A) a sensor housing having a cylindrical bore, a fluid inlet in communication with a first end of said bore, a port in the cylindrical wall of said bore, and fluid outlet in communication with said port;
   (B) a cylindrical flow sensing body mounted in said cylindrical bore;
   (C) a spring means mounted in said bore to bias said sensing body toward said first end of said bore to normally block flow from said inlet to said outlet;
   (D) a position sensing means mounted in said sensor housing to detect the position of said flow sensing body; and
   (E) a compensating means to reduce the biasing force provided by said spring means as the temperature of the fluid flowing through said sensor increases.

2. The flow sensor defined in claim 1 wherein said cylindrical flow sensing body has a smaller cross-sectional area than the cross-sectional area of said bore whereby a relatively non-viscous fluid may flow from said inlet to said outlet without displacing said flow sensing body to open said port.

3. The flow sensor defined in claim 2 wherein said compensating means includes a follower, with said spring means mounted between said follower and said flow sensing body.

4. The flow sensor defined in claim 3 wherein said compensating means further includes a temperature sensing device exposed to said viscous fluid and having a mechanical output element, said output element connected to said follower to move said follower away from said flow sensing body as the temperature of said viscous fluid increases.

5. The flow sensor defined in claim 4 wherein said spring means is a coil spring.

6. The flow sensor defined in claim 5 further comprising a follower spring mounted in said sensor housing to bias said follower toward said mechanical output element.

7. The flow sensor defined in claim 1 wherein said flow sensing body is magnetically polarized along its axis.

8. The flow sensor defined in claim 7 wherein said position sensing means includes a Hall-effect switch mounted in said sensor housing adjacent said first end of said bore.

9. The flow sensor defined in claim 8 wherein said position sensing means further includes a flux concentrator mounted in said housing coaxially with said bore.

* * * * *